United States Patent [19]
Glicksman et al.

[11] 3,922,369
[45] *Nov. 25, 1975

[54] LOW CALORIE SWEETENING COMPOSITION AND METHOD FOR MAKING SAME

[75] Inventors: Martin Glicksman, Valley Cottage, N.Y.; Bartley N. Wankier, Battle Creek, Mich.

[73] Assignee: General Foods Corporation, White Plains, N.Y.

[ * ] Notice: The portion of the term of this patent subsequent to Sept. 25, 1990, has been disclaimed.

[22] Filed: Aug. 13, 1973

[21] Appl. No.: 387,847

Related U.S. Application Data

[63] Continuation-in-part of Ser. No. 55,561, July 16, 1970, Pat. No. 3,761,288.

[52] U.S. Cl. .................................................. 426/548
[51] Int. Cl.² ............................................ A23L 1/236
[58] Field of Search ............ 426/213, 215, 217, 384, 426/212, 342, 443, 455, 456, 471, 380, 364

[56] References Cited
UNITED STATES PATENTS

| | | | |
|---|---|---|---|
| 3,492,131 | 1/1970 | Schlatter | 426/212 |
| 3,642,491 | 2/1972 | Schlatter | 426/217 X |
| 3,761,288 | 9/1973 | Glicksman et al. | 426/217 X |

*Primary Examiner*—A. Louis Monacell
*Assistant Examiner*—Esther L. Massung
*Attorney, Agent, or Firm*—Daniel J. Donovan; Doris M. Bennett

[57] ABSTRACT

Readily soluble, sweetening compositions are produced by co-drying solutions of an edible organic acid and a dipeptide sweetening compound.

4 Claims, No Drawings

LOW CALORIE SWEETENING COMPOSITION AND METHOD FOR MAKING SAME

RELATED APPLICATION

This application is a continuation-in-part of co-pending application, Ser. No. 55,561 filed July 16, 1970 now U.S. Pat. No. 3,761,288 issued Sept. 25, 1973. entitled "Low Calorie Sweetening Composition And Method For Making Same."

BACKGROUND OF THE INVENTION

This invention relates to a readily soluble sweetening composition containing an edible organic acid and a dipeptide sweetening agent and more particularly to a low bulk density sweetening composition which dissolves extremely rapidly in water but which possesses a bulk density and caloric value per unit of volume considerably less than that of sucrose.

Previous attempts to produce artificial sweeteners have involved the use of saccharins and/or cyclamates. Problems have arisen with the use of these compounds, however, since the saccharins leaves a somewhat bitter aftertaste in the mouth and the cyclamates are now excluded from commercial food products as hazardous to human health.

It has recently been found that certain dipeptide compounds possess an intense sweetness level. Examples of these compounds are set forth in U.S. Pat. Nos. 3,475,403 and 3,492,131. Most suitable among these compounds are the lower alkyl esters of aspartyl-phenylalanine wherein the stereochemical configuration is L-L, DL-DL, DL-L, or L-DL. Illustrative of the lower alkyl esters are methyl, ethyl, propyl, butyl, pentyl, hexyl, heptyl and the branched chain groups isometric therewith, with the methyl ester being the most preferred embodiment.

These dipeptide materials would appear to have great commercial applications as sweetening agents since they range up to 200 times the sweetness level of sucrose, have no discernible unpleasant aftertaste, and can be produced from naturally occurring amino acids. Problems have arisen, however, with the use of these compounds in that their rate of solution into water is markedly slower than sucrose, and that the compounds tend to decompose, losing substantially all their sweetness upon heating at temperatures above about 80°C.

SUMMARY OF THE INVENTION

It has now been found that the rate of solution of dipeptide sweetening compounds can be significantly increased by co-drying an aqueous solution of an edible organic acid and the dipeptide sweetening compound. It has also been found that, although freeze drying is preferred, surprisingly, these aqueous solutions may be dried by drum drying and spray drying, at conditions of elevated temperatures (i.e. above 100°C) without significant adverse effects on the sweetening level of the dipeptide compounds.

The edible organic acids suitable for use in this invention may be any of the non-toxic organic acids or combination of these heretofore employed by the prior art for this purpose such as malic, citric, adipic, fumaric, tartaric acids and the like.

It is an object of this invention to produce a low-calorie substitute for granulated sucrose.

It is a further object of this invention to produce a dipeptide-containing, low-calorie sweetening composition which has a rate of solution comparable or greater to that of sucrose.

DESCRIPTION OF THE INVENTION

According to one embodiment of this invention, a table sugar substitute may be prepared by forming a uniform aqueous solution of an edible organic acid and a dipeptide sweetening agent and drying this solution in a manner so as to yield an expanded product which may then, if necessary, be ground to size. Such drying methods as drum drying, spray drying and preferably freeze drying have been found suitable for producing these table sugar substitutes. As mentioned previously, although drum drying and spray drying may be used successfully, freee drying eliminates any possibility of degradation of the dipeptide due to excessive heat, no matter how insignificant the adverse effects on the sweetening level of the dipeptide may be as a result of such temperatures. In addition, the freeze dried table sweetener dissolves more rapidly than the samples dried by alternative methods and is preferred for this reason primarily.

The organic acids used for the production of these sugar substitutes dissolve easily in water to produce a clear solution. For this reason primarily, they are preferred over other bulking agents which could foreseeably be used such as the dextrins. In the latter case, one must carefully consider the molecular weight of the dextrin material which must be sufficiently low as to make it readily soluble to produce a clear solution and yet high enough as to make it non-hygroscopic. Such a consideration is not necessary when utilizing an edible organic acid.

Accordingly, it has been determined that for the production of table sugar substitutes, the non-toxic organic acids, preferably citric acid, are the ideal bulking agents for the purposes of this invention, the preferred method of this invention being therefore freezing-drying an aqueous solution of citric acid with a lower alkyl ester of aspartylphenylalanine, specifically L-aspartyl-L-phenylalanine methyl ester.

The processes of this invention are further illustrated but not limited by the following examples:

EXAMPLE 1

Three grams of citric acid and one gram of L-aspartyl-L-phenylalanine methyl ester are dissolved in 50 ml. of water with stirring. The resulting solution is spread on a stainless steel tray (2.1 sq. ft.) and allowed to dry at ambient conditions for about 2 days. The dry material was then scraped from the tray and ground with a mortar and pestle. One-half gram samples of this ground material were added with stirring, to beakers containing 200 ml of water at 40°F. The material completely dissolved in an average time of about 55 seconds yielding solutions which were sweet with a slight acid taste.

When the above experiment is repeated, except that the resulting solution is frozen and freeze dried in a Stokes Freeze Dryer, the resulting dry hydroscopic product dissolves in a matter of seconds.

EXAMPLE 2

A solution was prepared according to the method of Example 1 and this solution was drum dried at a temperature of 130°C on a drier operating at 25 lbs./sq. in. and 6.25 rpms.

EXAMPLE 3

Equal weight samples of the sweetening compositions of Examples 1 and 2 were dissolved in coffee samples and were organoleptically determined to have substantially equivalent sweetness levels. This sweetness level is not found to significantly differ from control coffee samples containing an equal amount of the untreated dipeptide material, thus indicating the absence of any degradation of the dipeptide material during the drying operations. The rate of solubility, however, is appreciably and substantially improved.

When 0.036 gram samples of L-aspartyl-L-phenylalanine methyl ester are sought to be dissolved in 170 ml of water at 40°F, with stirring, average times for complete solution run about 30 minutes.

Additional tests have shown that varying the level of dipeptide in the sweetening compositions up to the level of about one part dipeptide per part of organic acid does not have any appreciable or predictable effect on the rate of solution. All samples prepared in accordance with this invention were found to dissolve in water as cold as 40°F in less than 2 minutes. Where freeze drying was utilized, the time required to solubilize ranged from instantaneously to about 35 seconds. Complete solution of equivalent amounts of the dipeptide material taken alone, however, requires a time of about 30 minutes.

It has also been found that the elevated temperatures, in excess of 100°C, which are employed during the spray drying and drum drying operations, do not effect the sweetness of the final product.

The bulk density of the final sweetening composition can be controlled by varying the solids concentration of the solution prior to drying. The bulk density may also be controlled by changing the method of drying, by varying the rate of drying, or by varying the conditions of pressure or vacuum under which the solution is dried. Bulk densities ranging as low as about 0.04g/cc can be obtained by the process of the instant invention.

The addition of a small amount of an anti-caking agent such as tricalcium phosphate may also be used to adjust the bulk density of the final product.

Special dehydrating packaging can be employed to reduce moisture pick up. Thus, by exercising proper control over the process, it is possible to produce a final product which has substantially the same bulk density of granulated sucrose or a product which has a much lower bulk density than granulated sucrose, but which, by adjusting the level of dipeptide sweetening compound, has on a volume basis the same level of sweetness as sucrose but a far less caloric value. More importantly, the resulting co-dried product has a substantially greater rate of solubility and also a greater absolute solubility in water.

It will be apparent that there are variations and modifications of this invention and that the proportions, ingredients and typical operating conditions may be varied without departing from the scope of the invention.

Having thus described the invention, what is claimed is:

1. A method for producing a rapidly soluble sweetening composition comprising the steps of forming an aqueous solution of an edible organic acid and a dipeptide sweetening compound, said dipeptide being a lower alkyl ester of aspartylphenylalanine, and said aqueous solution containing less than about one part of said ester per part of organic acid, and freeze-drying the solution.

2. The method according to claim 1 wherein the sweetening compound is L-aspartyl-L-phenyl-alanine methyl ester.

3. The method of claim 1 wherein the organic acid is citric acid.

4. The product of the process of claim 1.

* * * * *